United States Patent [19]

Small

[11] Patent Number: 5,568,373

[45] Date of Patent: Oct. 22, 1996

[54] TOLERANT POWER CONVERTER

[76] Inventor: Kenneth T. Small, 17595 Montebello Rd., Cupertino, Calif. 95014

[21] Appl. No.: 281,754

[22] Filed: Jul. 28, 1994

[51] Int. Cl.[6] .................................. H02M 7/5387
[52] U.S. Cl. ............................. 363/132; 363/98
[58] Field of Search ....................... 363/17, 50, 58, 363/98, 132; 361/42, 59, 89, 94

[56] References Cited

U.S. PATENT DOCUMENTS

| | | | |
|---|---|---|---|
| 4,045,973 | 9/1977 | Anderson et al. | 62/158 |
| 4,553,070 | 11/1985 | Sairanen et al. | 315/209 R |
| 4,564,897 | 1/1986 | Okamoto et al. | 363/132 |
| 4,896,242 | 1/1990 | Neft | 361/87 |
| 5,057,698 | 10/1991 | Widener et al. | 363/98 |
| 5,132,889 | 7/1992 | Hitchcock et al. | 363/17 |
| 5,303,140 | 4/1994 | Shimizu | 363/132 |
| 5,365,422 | 11/1994 | Close et al. | 363/98 |
| 5,379,209 | 1/1995 | Goff | 363/132 |

*Primary Examiner*—Matthew V. Nguyen

[57] ABSTRACT

A solid-state power converter using a transistor bridge structure and symmetry modulation to improve output stability when driving resonant loads. The power converter utilize a direct coupled driver for each upper switching transistor, permitting a wider control range than a transformer. In addition, various circuits to protect the load and the converter include: power limiting, surge reduction, thermal limiting, input over-voltage protection, output over-voltage shutdown, ground-fault shutdown, re-start delay, soft-start, and low-current off-on switch.

20 Claims, 6 Drawing Sheets

FIG. 2A  Q1 TRANSISTOR CONDITION

FIG. 2B  Q2 TRANSISTOR CONDITION

FIG. 2C  Q3 TRANSISTOR CONDITION

FIG. 2D  Q4 TRANSISTOR CONDITION

FIG. 2E  OUTPUT BUS VOLTAGE

FIG. 2F  OUTPUT BUS IMPEDANCE    ALWAYS LOW

FIG. 3A  Q1 TRANSISTOR CONDITION

FIG. 3B  Q2 TRANSISTOR CONDITION

FIG. 3C  OUTPUT BUS VOLTAGE

FIG. 3D  OUTPUT BUS IMPEDANCE    ALWAYS LOW

TOLERANT POWER CONVERTER

FIELD OF THE INVENTION

The present invention pertains to the field of electronic power conversion. More specifically, the present invention is related to an apparatus and method of providing a tolerant, solid-state power converter.

BACKGROUND OF THE INVENTION

Various power converters topologies and control methods are well known. Power converters convert AC or DC input power into AC or DC output power and may provide electrical isolation between input and output connections. A control method is often used to control the output power in some desired way. Depending upon the topology used, the control method usually varies one of the timing parameters of the power converter, for example: pulse width, switching frequency or phase relationships.

A common, prior art, control method is pulse width modulation, used to regulate the output power. The modulator symmetrically controls the "on" duration of a pair of power switching transistors. These transistors alternately pulse equal "on" durations. Power is increased by increasing the durations, until each reach 50%. Advantages of pulse width modulation include simplicity, and the ability to easily reduce the output power to zero, by reducing the pulse widths to zero. This wide (zero to 100%) power control range is ideal, and is needed to tolerate a wide normal load range, and a wide range of abnormal operating conditions.

The ability to continuously reduce the output power to zero is required to prevent potentially damaging overcurrent, overvoltage or overtemperature conditions. Not all simple control methods will reduce the power to zero. For example, frequency-modulated symmetrical (2 transistor, "dual-ended") resonant power converters continue to produce some output power when in an "off-frequency" minimum-power control condition.

Resonant L-C circuit elements are often part of the power converter. L-C circuits may be intentionally included in the power path of the converter to reduce EMI and switching losses by slowing the rise time of current and voltage. They may also be unavoidably part of the converter when an AC output converter drives a reactive (L or C) load. In some power converters, maximum efficiency is obtained when the L-C resonant frequency matches the converter's switching transistor frequency.

Unfortunately, the advantageous combination of pulse width modulation in a power converter whose switching frequency and L-C resonant frequency are similar, creates an undesirable "cogging" problem. The cogging results from the interaction of the L-C resonant circuit and the switching transistors that are turned off for part of each switching cycle. During the turned-off time, (also known as "dead-time") the L-C resonant circuit is unclamped and allowed to resonate at its natural frequency. The result is a phase error between the L-C frequency and the switching frequency that frequently "jitters" from one switch cycle to the next often at a sub-multiple of the switching frequency. "Jitter" may produce audible noise, additional device stress and a reduction in efficiency. Additionally, during "dead-time", parasitic resonant L-C elements are allowed to freely resonate or "ring", which may produce electro-magnetic noise at frequencies above the switching frequency. In the prior art, control methods without "dead-time" such as frequency modulation have been used to control output power. Although cogging and ringing problems are avoided, the simplicity and zero-power capability of pulse width modulation are lost.

Switching power transistors are often used in series, in multiples of 2 (for example: half-bridge, full-bridge, three phase bridge). These switching circuits require isolated FET transistor gate drive for the "upper" isolated transistor. Converters commonly use transformers to couple control signals to the "upper" FET switching transistor and to provide DC isolation. One disadvantage of transformers is their variation in output voltage. The transformer secondary voltage, and therefore the FET gate voltage will vary with the on-time, which results in either excessive FET gate voltage at small pulse width, or else inadequate FET gate voltage at large pulse width. Often, additional circuitry is required to regulate the FET gate voltage. In general, because transformers cannot pass DC, they cannot be used to operate FET transistors at or near 100% duty factors and have a limited duty-cycle range. Other disadvantages of transformers are their size (especially at frequencies of 20 kHz and lower), cost, weight and packaging miniaturization difficulties.

Overtemperature protection is used to prevent power converter damage from overheating due to fault, overload or excessive external ambient temperatures. Typically, the power converter is turned off when a temperature limit is reached. When the converter cools, the converter may be allowed to restart and heat up again. Often, the result is an oscillation when the converter turns on and off repeatedly. This oscillation is undesirable and unavoidable with prior art overtemperature protection methods.

In the prior art, off/on switches are often used between the power converter and its power source. If the power converter uses a large value capacitor across its DC input bus, a large surge of current will flow into the capacitor each time the off/on switch is closed. The surge is typically 10 or 20 times normal operating current, and may cause damage to the switch and other components that repeatedly conduct the surge current. The frequent surge may be eliminated if the off/on switch is relocated into the control circuitry. This change unfortunately requires a relatively expensive switch with gold contacts to operate reliably in low voltage and low current control circuits. The ideal solution would eliminate the surge when the off/on switch is closed, and operate the switch at high voltage but low current. This would allow using an inexpensive switch with non-precious contact material such as brass.

Power converters should be tolerant to excessive input voltage occurring from transients such as lightning strikes and power line over-voltage transients. In the prior art, this tolerance is usually provided by safety factors or de-rating of components that are subject to excessive voltage. These safety factors result in more expensive components and result in a compromise that typically limits the allowable overvoltage to about 20%. The high cost of higher voltage rated switching transistors usually dominate in this compromise. It would be expensive to provide a desirable 100% transistor voltage safety factor.

Therefore there is a need in the prior art for a protected power converter that may be controlled from 0% to 100% output power without transformer caused FET transistor gate drive difficulties. It would be preferable if such a converter would not "cog" with L-C resonant circuit elements while retaining the advantages of pulse width modulation. It would also be preferable if overtemperature protection did not result in undesirable off/on thermal cycling.

Another need in the prior art is the elimination of repeated abuse from input surge current when the off/on switch is closed. Also, there is a need for increased tolerance to input overvoltage transients without substantially increased cost.

SUMMARY AND OBJECTS OF THE INVENTION

The present invention pertains to a solid state power converter. In one embodiment, constant switching frequency, asymmetrical square-wave "symmetry" modulation is used rather than symmetrical pulse-width modulation. The switching transistors are arranged in symmetrical, 2 and 4 transistor configurations known as half-bridge and full-bridge. The elimination of "off-time" in the converter precludes "cogging" and "ringing" effects with L-C resonant circuit elements. The symmetry modulation is simple and permits zero to 100% output power control which allows a wide range of operating conditions.

In another embodiment, a DC coupled (no transformer) upper FET transistor drive circuit is provided. The drive circuit performance, cost, and size is not compromised at very large or small duty cycles, or at low (e.g. 20 kHz) switching frequencies.

Furthermore, one or more of the following protection circuits may be included. These protection circuits include an overtemperature protection method that is free from cycling oscillation. The converter also tolerates operation in high ambient temperatures by reducing power to limit converter component temperatures. Operation at reduced power is often preferable to thermally cycling off/on in many applications.

In addition, a circuit may be included to eliminate repeated, high stress input current surges when using an off-on switch, but allows inexpensive switch contact materials.

BRIEF DESCRIPTION OF THE DRAWINGS

The present invention is illustrated by way of example, and not by way of limitation, in the figures of the accompanying drawings and in which like reference numerals refer to similar elements in which.

DETAILED DESCRIPTION

Figure 1A:
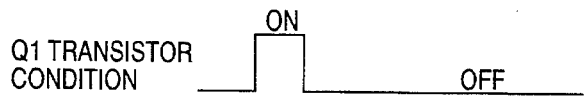
FIG. 1 is a block diagram of the prior art, a pulse width modulated half-bridge switching transistor configuration with waveforms.
Figure 1B:
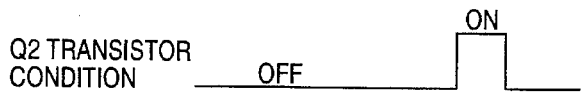
Figure 1C:
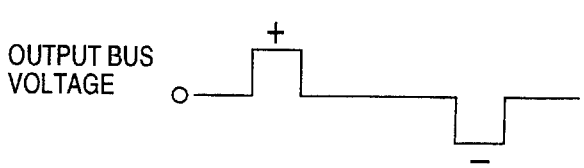
Figure 1D:
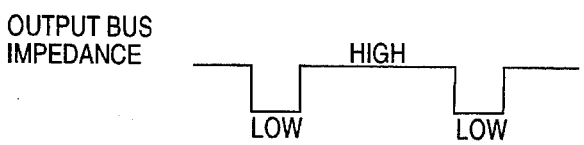
Figure 1E:
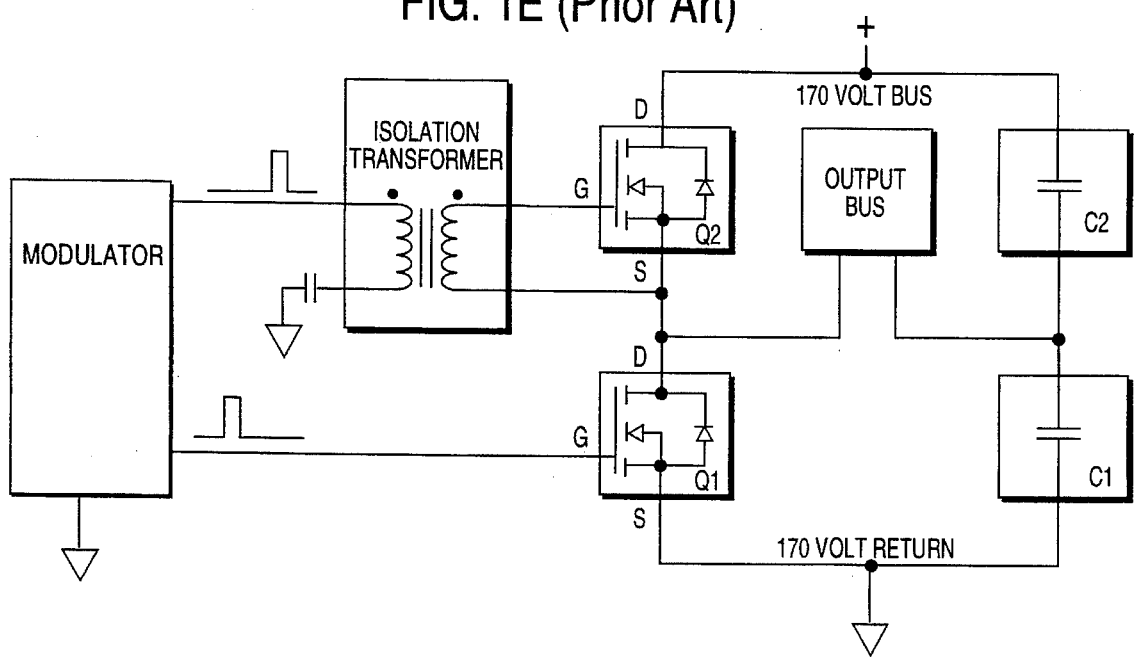
Figure 2G:
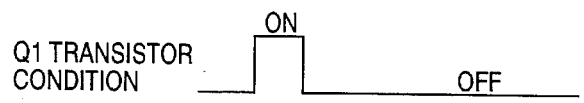
FIG. 2 is a block diagram of the present invention, a symmetry modulated full-bridge switching transistor configuration with waveforms.
Figure 2G:
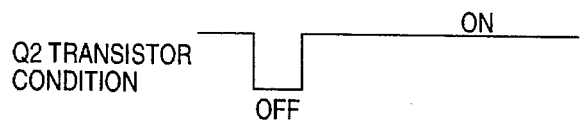
Figure 2G:
Figure 2G:
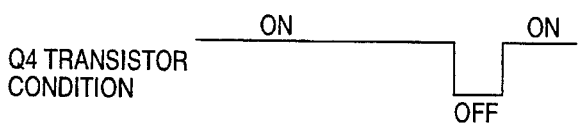
Figure 2G:
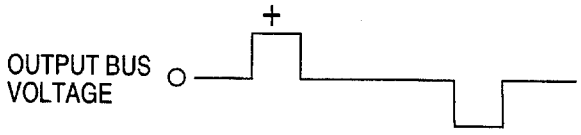
Figure 2G:
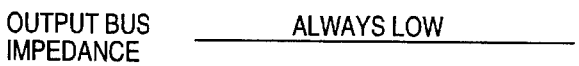
Figure 2G:
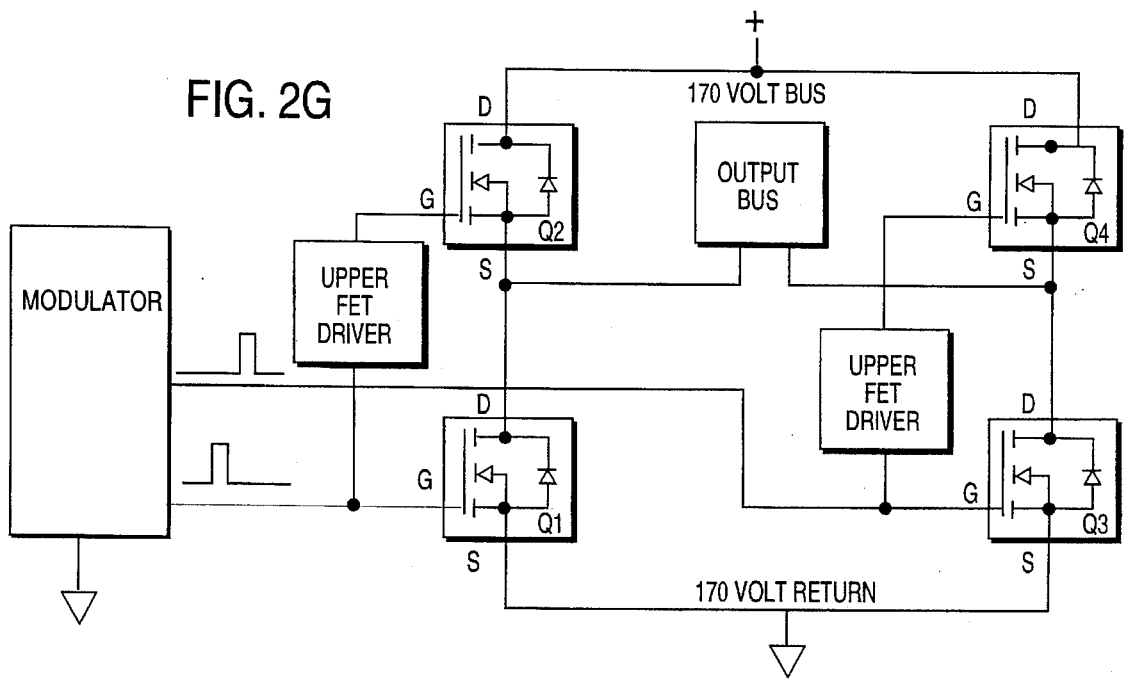
Figure 3E:
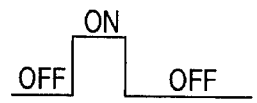
FIG. 3 is a block diagram of the present invention, a symmetry modulated half-bridge switching transistor configuration with waveforms.
Figure 3E:
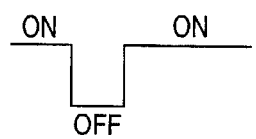
Figure 3E:
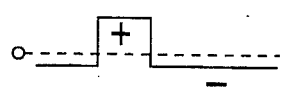
Figure 3E:
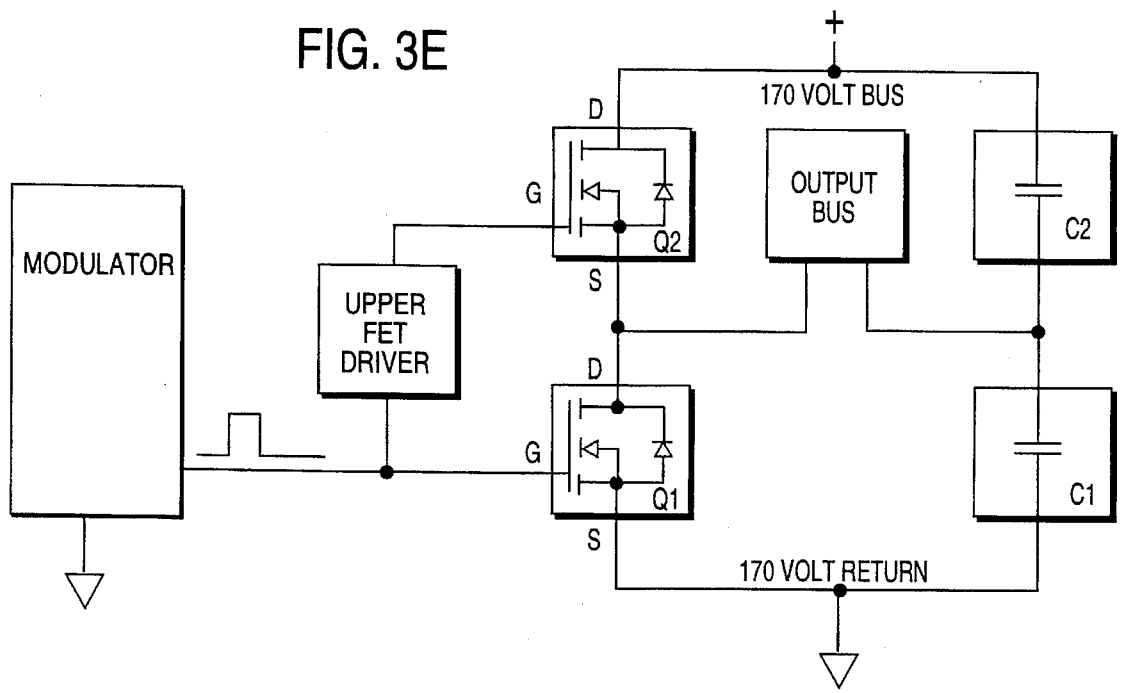

A tolerant, solid-state power converter is described. In the following description, for purposes of explanation, many specific details are set forth, such as component values, voltages, currents, frequencies, etc., in order to provide a thorough understanding of the present invention. It will be obvious, however, to one skilled in the art that the present invention may be practiced without these specific details. In other instances, well known structures are shown in block diagram form in order to avoid unnecessarily obscuring the present invention.

FIG. 1 shows a simplified prior art half-bridge transistor configuration with waveforms. A modulator drives transistor Q1 directly, and drives transistor Q2 through an isolation transformer. C1 and C2 are direct current (DC) blocking capacitors that permit alternating current (AC) coupling to an output bus. The four, single switching cycle timing waveforms (A through D) illustrate operation at about 50% power. Waveforms A through C illustrate that for about 50% of the switching cycle, either Q1 or Q2 is turned on, resulting in a symmetrical voltage waveform across the output bus. During "dead-time", while Q1 and Q2 are both turned off, the output bus is not terminated by the low impedance across the 170 volt input bus. The resulting high output bus impedance during portions of the switching cycle, shown in figure D, allows resonance of the unclamped L-C elements across the output bus. This resonance results in noise generation and a potential "cogging" instability.

FIG. 2 shows a simplified full-bridge configuration of the present invention with waveforms A through F shown at about 50% power. The modulator is identical to the modulator used in FIG. 1. The modulator drives transistors Q1 and Q3 with the same waveforms A and B shown in FIG. 1. In FIG. 2, waveforms A and C illustrate that for about 50% of the switching cycle, either Q1 or Q3 is turned on. A top FET driver is coupled to the gate of Q1. This top FET driver inverts the polarity from the gate of Q1 and drives Q2 as shown in waveform B. Similarly, a second top FET driver coupled to the gate of Q3 inverts the waveform and drives Q4 with waveform D. The result is a symmetrical waveform E, which is similar to FIG. 1, waveform C. However, because either Q1 or Q2 is on, and because either Q3 or Q4 is on, the output bus is always terminated by the 170 volt bus. Dead-time is absent in FIG. 2, and the output impedance is therefore low throughout the cycle as shown in waveform F. Ringing and cogging are prevented because of the clamping effect.

FIG. 3 shows a simplified half-bridge version of the preferred embodiment of the invention. One of the two outputs of the modulator used in FIGS. 1 or 2 drives FET Q1 as shown in waveform A at about a 50% power level. A single output modulator may be substituted. The Upper FET driver inverts the signal on the gate of Q1 and drives FET Q2. At any part of the switching cycle, either Q1 or Q2 is on. The dead-time is zero throughout the switching cycle, and the output bus has a continuous AC connection to the low impedance 170 volt bus. Waveform D illustrates that the output bus impedance is zero through out the switching cycle, and that cogging and ringing are prevented. Capacitors C1 and C2 block DC, and permit AC coupling to an output bus. Waveform C, the output bus voltage, shows that the output waveform is not symmetrical about the zero volt line. The pulse widths on either side of the zero volt line also are not symmetrical. Capacitors C1 and C2 permit a DC offset to allow for the lack of symmetry between Q1 and Q2 pulse widths.

Figure 4:
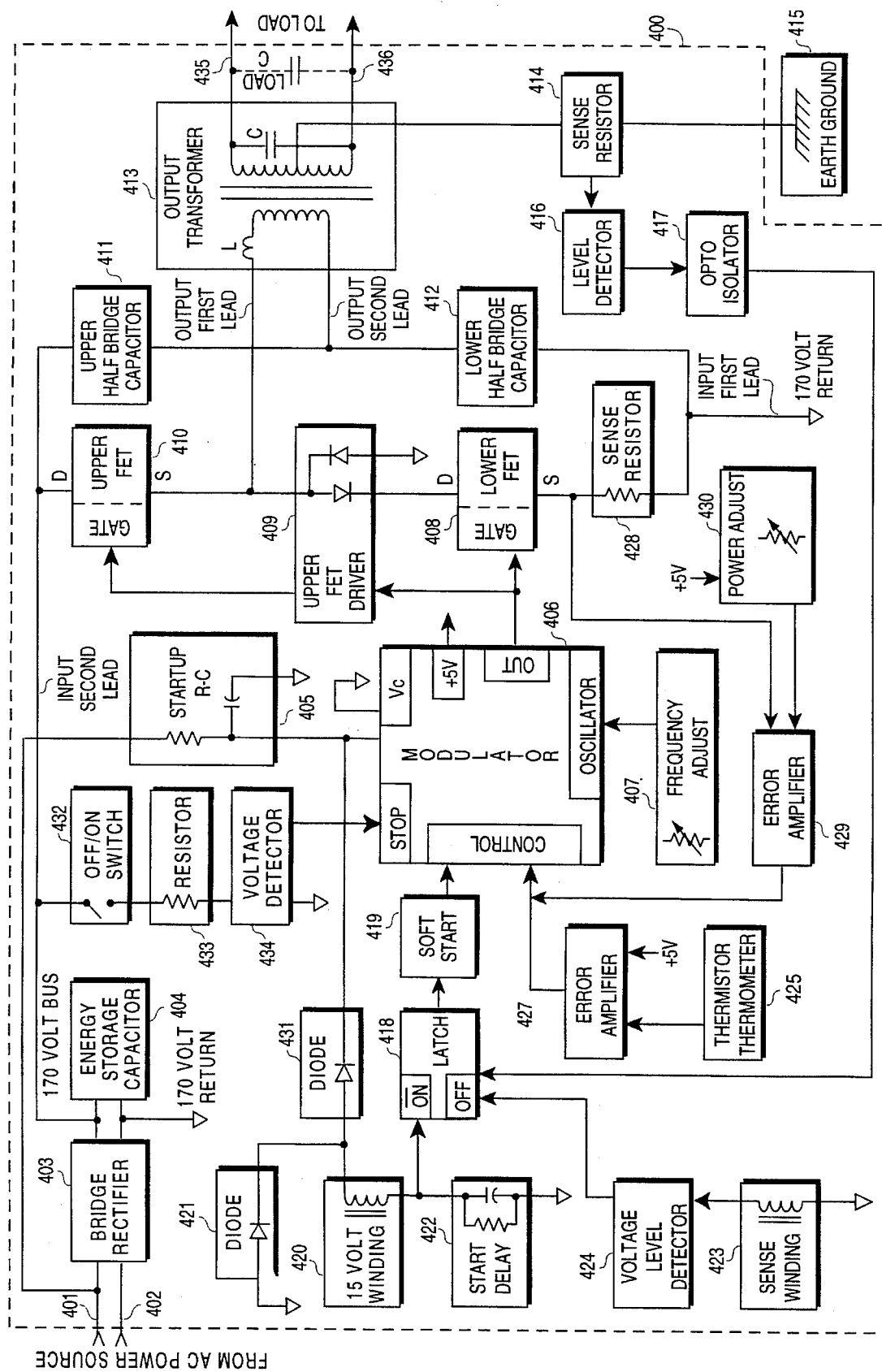
FIG. 4 is a block diagram showing the currently preferred embodiment of the tolerant power converter of the present invention.

Referring to FIG. 4, a block diagram of the currently preferred embodiment of the present invention is shown. It can be seen that a power converter 400 is coupled between an input line 401 and an input line 402 from a power source (not shown). The power source is 120 VAC, 60 Hz utility power. The load (not shown) is coupled between an output line 435 and an output line 436. Converter 400 supplies approximately 5000 VAC at approximately 0.03 amps to the load. By changing the primary to secondary turns ratio of an output transformer 413, the output voltage across lines 435 and 436 may be varied from less than 1 volt to tens of thousands of volts.

Converter 400 is comprised of a bridge rectifier 403. Rectifier 403 is connected to input lines 401 and 402. Rectifier 403 is used to convert AC input voltage to DC voltage. An energy storage capacitor 404 connected across the output of rectifier 403 provides a nearly constant source of a 170 VDC. Capacitor 404 is connected between a 170 volt input bus, and an input bus return. Capacitor 404 allows converter 400 to deliver full output power during low voltage portions of the AC input sine wave. In addition, capacitor 404 reduces noise and voltage spikes from being conducted in either direction along input lines 401 and 402. Capacitor 404 also reduces the magnitude of voltage overshoot on the 170 VDC bus resulting from AC input power transients and lightning strikes, and increases the tolerance to damage by input overvoltage to converter 400.

Block 405 is a startup resistor and capacitor. The current through a resistor in block 405 charges a capacitor in block 405 until the voltage across the capacitor reaches 15 volts, the turn-on threshold of the modulator I.C. 406. After turn-on, I.C. 406 draws more current than can be supplied by the resistor in block 405, and the 15 volts level decreases. When the voltage reaches 10 volts, I.C. 406 turns off and the cycle repeats. If converter 400 produces output power when I.C. 406 is on, 15 volts generated by a 15 V winding 420 on output transformer 413, a rectifier 421, and a rectifier 431, prevent the dropping output from block 405, and the power converter 400 continues to run. This process is commonly known as a "bootstrap startup". The full range operating regulation "droop" of the 15 volts winding 420 must not be excessive or the modulator I.C. 406 will turn off. A single rectifier (half wave) circuit would produce excessive "droop" and is not compatible with the symmetry modulation of this invention. Converter 400 however, solves this problem with rectifiers 421 and 431 in a (full wave) circuit also using a capacitor in block 422. The full-wave rectifier circuit produces relatively constant 15 V output when used with symmetry modulation.

In addition, the capacitor in block 422 functions to delay the restart of the converter for 3 seconds to reduce the average "on-time" and power dissipation during repeated attempts to restart into an uncleared fault. In addition, safety agencies such as Underwriter's Laboratories sometimes require a delay of several seconds after a shutdown before a restart attempt. Because a resistor in block 422 is a high value, a smaller value capacitor in block 422 is usable. The capacitor in block 422 is rapidly charged when winding 420 is active, so even a quickly aborted start-up will result in the same duration re-start delay. When converter 400 stops, it will not start until the capacitor in block 422 discharges, and a start/stop latch 418 is set to "on".

Turning on latch 418 activates a soft-start 419, which controls modulator 406 to ramp to full power limited by the voltage rise on a capacitor in block 419. Previous operation of converter 400 leaves an upper ½ bridge capacitor 411 with 0 volts across it. It will remain 0 volts for at least 3 seconds. Because the re-start voltage on capacitor 411 also starts with 0 volts, the re-start is smooth. After about 0.01 seconds, modulator I.C. 406 reaches full power with a 50% output duty factor. At full power, a FET transistor 408 is turned on for 50% of each switching cycle. Also a FET transistor 410 is turned on for the remaining 50% of the switching cycle. This forces the voltage across capacitor 411 to 87 volts. The voltage across capacitor 411 may drift in any direction after a few seconds of non-operation. Initial operation at 100% power may cause start-up current surge in transistors 408 and 410 after voltage drift. Soft-starting from initially low power levels allows enough time to correct the voltage drift on capacitor 411 without surges. In addition, by increasing power slowly, protection circuits have sufficient time to limit the peak voltage or currents to lower values.

The output of modulator I.C. 406 is a pulse of a constant 15 volt height, constant frequency, but variable pulse-width depending upon power level: Narrow pulses (short time at 15 volts) generates less power, and a 50% duty pulse (symmetrical) generates maximum power. I.C 406 internally limits the maximum duty % to 50%. I.C. 406 was designed for low-cost, single-transistor topologies such as flyback and forward converters. Symmetry modulation and an upper FET driver 409 of this invention utilize modulator I.C. 406 in a 2-transistor series circuit connected across the 170 volt bus. I.C. 406 drives the gate of lower FET 408 and supplies power and timing signals to upper FET driver 409. Driver 409 inverts the polarity of the pulse and drives the gate of upper FET 410. Since either the lower FET 408 or the upper FET 410 is on, there is no "dead-time", or time that both FET 408 and 410 are off. The output pulse waveform going to transformer 413 is identical to the inverse of the pulse waveform from the output of modulator I.C. 406, due to phase inversion in FETs 408 and 410.

The other end of the primary of output transformer 413 is connected to half-bridge capacitors 411 and a half-bridge capacitor 412, which form an AC path return to 170 volt bus and bus return. The operation of capacitors 411 and 412 are similar to other well known half-bridge circuits. An average voltage at the connection point of capacitors 411 and 412 is half of the 170 V bus voltage at 100% power. However, as modulator I.C. 406 reduces output power to zero using symmetry modulation, the average connection point voltage of capacitors 411 and 412 climbs to 170 V.

Output transformer 413 is an imperfect transformer and will have an imperfect magnetic coupling between a primary and a secondary windings. This imperfect coupling results in a "leakage inductance". "Leakage" inductance is shown as a lumped inductance L in series with a primary in transformer 413. Non-ideal transformers also have an interwinding capacitance which is similarly shown as a lumped capacitor C across a secondary in transformer 413. The total capacitance across the secondary in transformer 413 is further increased by a capacitance across output lines 435 and 436 (Load C). If the series resonant circuit comprised of the L and C in transformer 413 plus the capacitance across lines 435 and 436 (load C) is driven at its resonant frequency, maximum power will be transferred through transformer 413 providing high converter 400 efficiency. Frequency adjustment is provided by a block 407 to adjust the switching frequency to the resonant frequency of output transformer 413.

The tolerance to an output overload is provided to protect the power converter 400 by using a feedback control loop to limit the input current to a safe value. The DC current through the 170 volt bus is converted to a small voltage (approximately 1 volt) by a resistor 428. The voltage is applied to an error amplifier 429 and compared to a reference voltage set by a power adjustment 430. Error amplifier 429 controls the modulator I.C. 406 pulse symmetry to regulate a current through sense resistor 428 and also the power produced by power converter 400. In applications for power converter 400 such as an illumination of a gas discharge tube, power adjustment 430 will function as a lamp brightness control.

Another control loop is used to prevent damage from an excessive temperature in converter 400 by reducing output power just enough so that a predetermined temperature limit may be reached but not exceeded. Although an amount of power produced is less at a higher temperature, a limitation is better for some applications (such as lighting) than a turning off, a cooling, and a restarting, which result in a continuing of an off/on oscillations. Temperature is sensed by NTC thermistor 425 which produces a voltage that varies with temperature. The voltage is compared to a reference voltage by an error amplifier 427. The output of amplifier 427 controls the pulse symmetry of modulator I.C. 406 thereby limiting the power of converter 400 and preventing the excessive temperature.

Power converter 400 should be tolerant to operating without the load, which may result in an extremely high output voltage from a series-resonant action of L and C in output transformer 413. An overvoltage is detected by an overvoltage shutdown circuit. A sense winding 423 wound in proximity to the secondary winding in output transformer 413 produces about 2 volts under a normal operating condition. During output overvoltage conditions, winding 423 produces additional voltage sufficient to trip a level detector 424. Level detector 424 turns off a latch 410 and rapidly stops converter 400. A restart will not occur for three seconds until the capacitor in delay 422 has discharged. During restart, a soft-start 419 restricts a rate-of-rise of output voltage thereby facilitating an early detection of a subsequent overvoltage condition A tolerance to a ground fault on output lines 435 and 436 is provided by a detector circuit that turns off converter 400 when an excessive ground current is detected. A sense resistor 414, connected between an Earth ground 415 and a centertap on the secondary of transformer 413, develops a voltage proportional to an Earth ground current. When the voltage across resistor 414 exceeds about 6 volts, a level detector 416 conducts, turning in an opto-isolator 417 and setting latch 418 to "off". Then, converter 400 turns off. After three seconds, a soft and a gradual re-start prevents false tripping of the detector circuit.

Tolerance to a 100% sustained input overvoltage is obtained by preventing FET transistors 408 and 410 from being turned on during input overvoltage conditions. This is because a breakdown voltage limit of two transistors in series is additive, allowing a doubling of a voltage capability. An overvoltage detector 434 senses a voltage on the 170 volt bus through a closed off/on switch 432 and a resistor 433. When detector 434 senses an excessive bus voltage, detector 434 stops modulator I.C. 406 and both transistors 408 and 410 turn off. When the 170 volt bus voltage drops to a normal voltage, detector 434 allows I.C. 406 to restart converter 400.

A protection from a repeating turn-on current surge is accomplished by removing off/on switch 432 from the input current. Instead, switch 432 controls a low-power level control circuits. Resistor 433 limits a current through switch 432 to less than 1 mA, but allows the full 170 volt bus to appear across a pair of switch contacts. The 170 volts across the switch contacts breaks down an oxide insulating film that occurs on non-gold plated switch contact materials (brass) and allows use of a common, inexpensive switch. When the switch 432 is opened, detector 434 responds to the complete absence of a sensed voltage by stopping I.C. 406.

Figure 5:
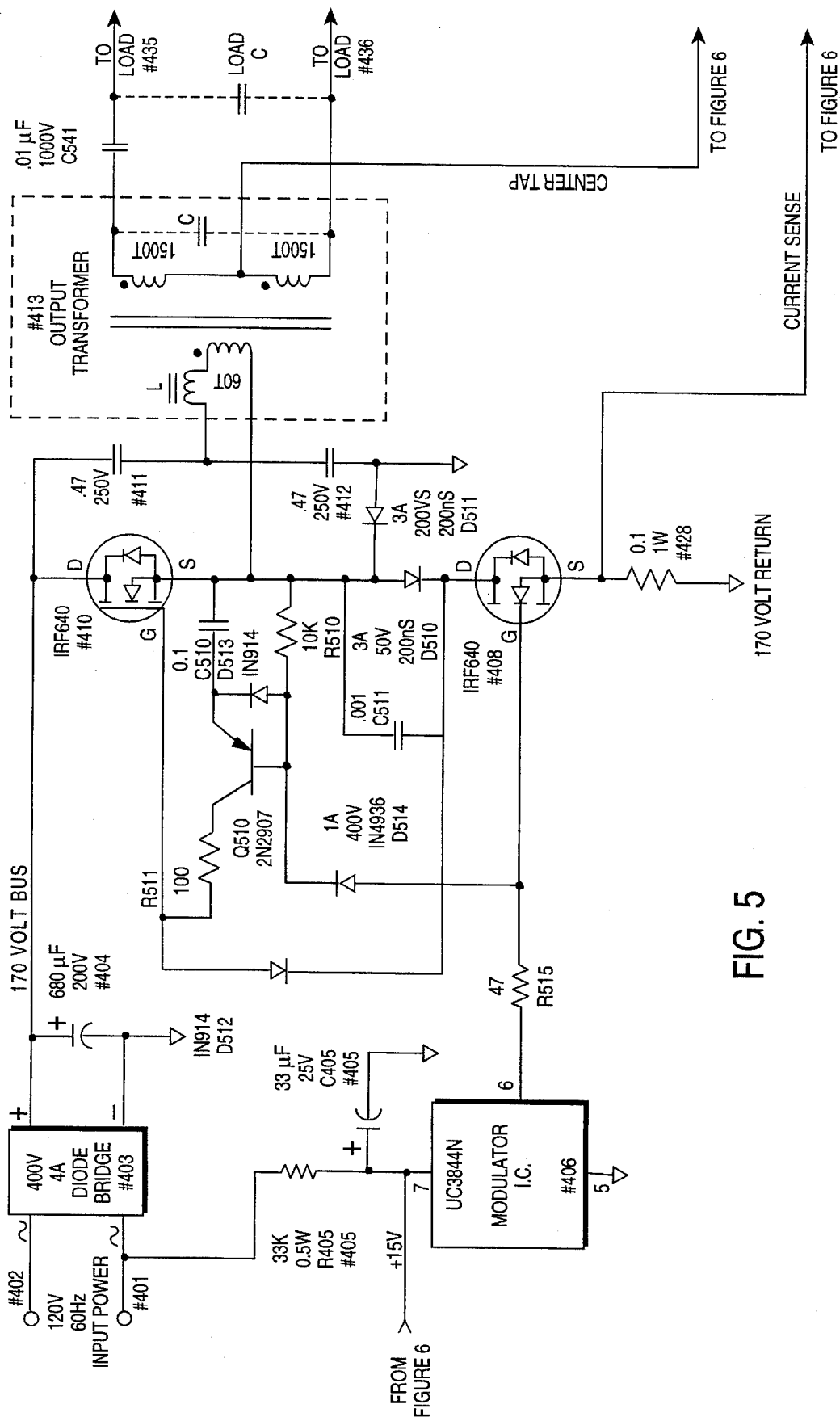
FIG. 5 is the first half of a detailed circuit diagram of the currently preferred embodiment of the tolerant power converter showing the power handling portion of the present invention.

FIG. 5 is a detailed, partial circuit diagram of the currently preferred embodiment of the tolerant power converter showing the power-switching portion of the present invention.

In FIG. 5, I.C. modulator 406 is connected to lower FET 408 through resistor R515 which functions to limit the current from I.C. 406 to 0.3 amps. Resistor R515 also slows the turn-on of FET 408 and reduces noise generation from turn-on current transients through FET 408. When FET 408 starts to turn on, its drain current discharges the +13 volt gate charge on FET 410, thereby turning off FET 410. While FET 408 is turning on, resistor R511 limits the current through FET 510 to about 0.1 amps and reduces the discharge of capacitor C510. When FET 408 is fully on, the source of FET 408 is connected to the 170 volt return through diode D510, FET 501, and resistor R513. This permits reservoir capacitor C510 to charge to 13 volts from the current flowing out of FET 408, through resistor R515, through diode D514, through diode D513, and into capacitor C510. The forward 0.6 volt drop across diode D513 keeps transistor Q510 turned off. When FET 408 is on, current in the primary of transformer 113 flows through diode D510, FET 408, sense resistor R513, and into the 170 volt return.

Diode D511 prevents reverse voltage across diode D510 when FET 408 is on. When the pulse from modulator I.C. 406 turns off, R515 slows the turnoff of current in FET 406 which reduces noise generation. Also, diode D514 becomes reversed biased, allowing resistor R510 to turn on transistor Q510. About 0.1 amps flows through resistor R511, diode D512, reverse biases diode D510, and allows the gate of FET 410 to be charged to about 13 volts to turn on FET 410. Capacitor C511 slightly slows the turn-on of FET 410 and reduces noise generation. When FET 410 is on, current flows from the 170 volt bus, through FET 410 and into the primary of output transformer 413. When the power converter turns off, resistor R510 discharges capacitor C510 and the gate of FET 410 in about 0.003 seconds. This permits both FETs 408 and 410, in series, to withstand 340 volts from 100% overvoltage conditions on the 170 volt bus.

In FIG. 5, it can be seen that 120 VAC is applied to the input terminals of full-wave, 4-diode bridge 403. The energy storage capacitor 404 is across the output of bridge 403 and reduces the AC ripple to less than 20 volts on the 170 volt bus. Upper half-bridge capacitor 411 and lower half-bridge capacitor 412 provide an AC current return path from output transformer 413 primary to the 170 volt bus and 170 volt return.

Start-up Resistor R405 is connected to one (either one) of the AC input connections of bridge 403, rather than to the 170 volt bus. This prevents a condition where the power converter tries to re-start momentarily (after 3 seconds) by using the residual energy remaining in capacitor 404, when the input AC power is removed, and off/on switch 432 is in the "on" position. With the preferred connection of resistor R405 to bridge 403 as shown in FIG. 5, the power converter will not try to start unless AC input voltage is present. This is because the diodes in bridge 403 block the current path from the 170 volt bus to start-up resistor R405.

In some applications, DC current flowing in the secondary of output transformer 413 cause flux offset core saturation in the transformer, or problems in the load, such as mercury migration in fluorescent gas-discharge lamps. The addition of DC current blocking capacitor C541 in series with the secondary current path of transformer 413 provides a means to insure that the average current is zero.

Figure 6:
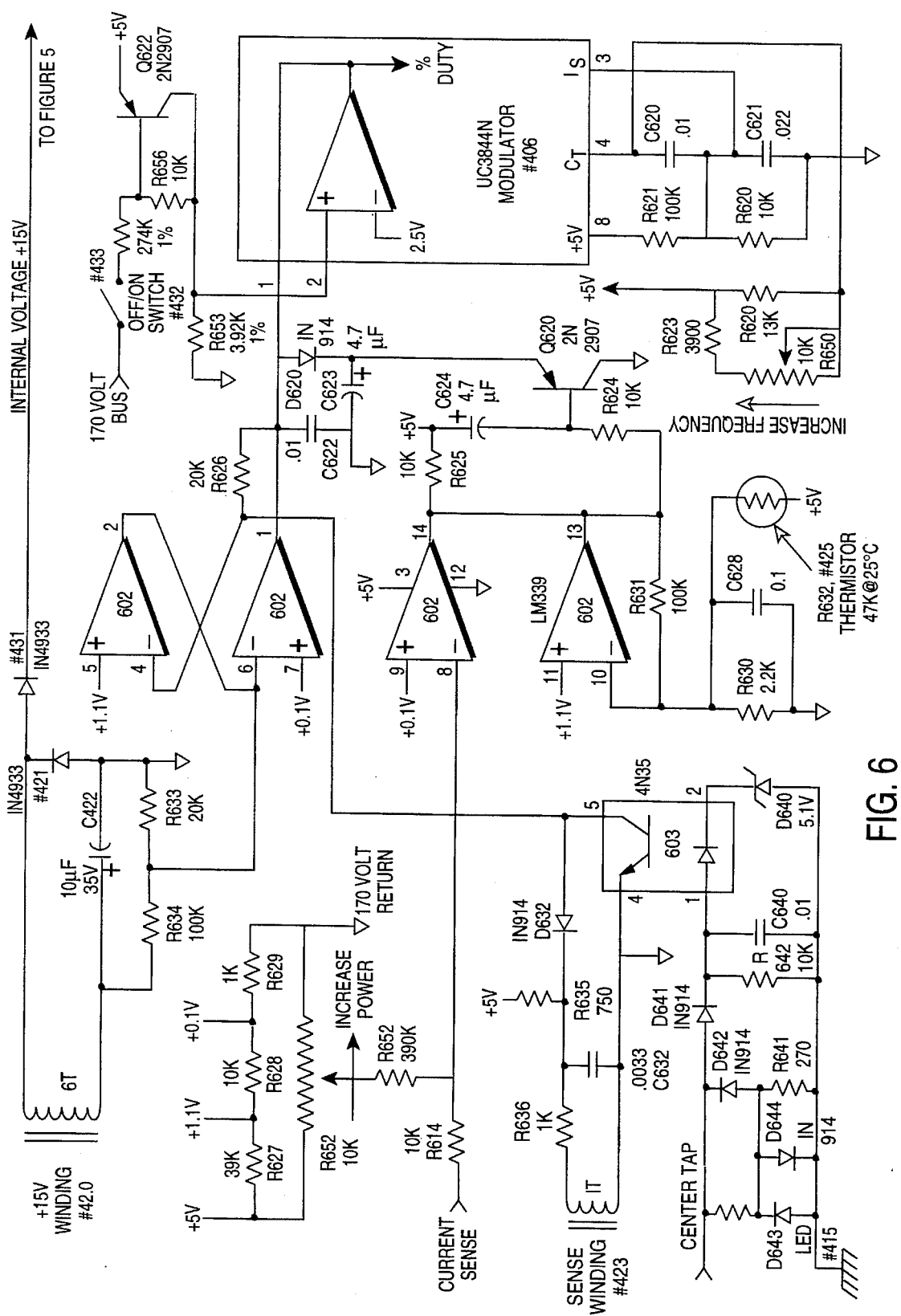
FIG. 6 is the second half of a detailed circuit diagram of the currently preferred embodiment of the tolerant power converter showing the control and protection portion of the present invention.

FIG. 6 is a detailed, partial circuit diagram of the currently preferred embodiment of the tolerant power converter showing the control and protection portion of the present invention. The combination of FIGS. 5 and 6 show the complete detailed schematic diagram of the currently preferred embodiment of the tolerant power converter.

In FIG. 6, the modulator I.C. 406 is part number UC3844 manufactured by Unitrode Integrated Circuits Corporation, 7 Continental Blvd., Merrimack, N.H. 03054 and Motorola Semiconductor Products Inc., Phoenix, Ariz. 85036. The oscillator in I.C. 406 determines the switching frequency, and is adjusted by potentiometer R650 in combination with resistors R623, R620, and capacitors C620, and C621. The switching frequency is adjusted to match the L-C resonant frequency of the combined output transformer and load reactance. I.C. 406 is operated in a simple, "voltage ramp" control configuration. Voltage ramp control designates a circuit where the main feedback loop error voltage on pin 1 of I.C. 406 is internally compared to a sawtooth waveform AC voltage from the oscillator present at pin 3 of I.C. 406. Capacitors C620 and C621 form an AC voltage divider to reduce the peak-to-peak voltage on pin 3 to about 0.6 volts. Resistors R621 and R622 set the 0.5 volt average DC point on pin 3. As the voltage on pin 1 rises, the output pulse-width on pin 6 of I C. 406 increases from 0 to 50% maximum. Soft-start capacitor C623 holds down Pin 1 through diode D620, requiring about 0.01 seconds to ramp from 0 to 50% pulsewidth during start up of the power converter.

In FIG. 6, comparator U602 is an industry standard quad comparator with open collector outputs, part number LM339. It is manufactured by Motorola Semiconductor Products, Inc., and others. Resistors R627, R628 and R629 form a reference voltage divider that supplies 1.1 volt and 0.1 volt to inputs on comparator U602.

Comparator U602 functions as the error amplifier for the input current and temperature regulating control loops. The outputs of these amplifiers are added by connecting together comparator U602 pins 13 and 14, thereby allowing current limiting control by either regulating control loop. Resistor R625 is a pull-up resistor, and resistor R624 along with capacitor C624 set the dominant, single-pole frequency compensation for both control loops. Transistor Q620 is an emitter follower buffer.

Thermistor R632 and resistor R630 set the maximum allowable component temperature to 85 degrees Centigrade. Any higher component temperatures cause pin 10 of comparator U602 to exceed 1.1 volts, which causes pin 13 of comparator U602 to pull down and limit the input current. This halts temperature rise. Resistor R631 reduces the DC gain of the temperature regulating loop. This reduces the settling time required to reach thermal equilibrium at 85 degrees C.

The current regulating control loop measures and regulates the average AC input current Sense resistor R513 (shown in FIG. 5) develops a voltage proportional to the current into the 170 volt return. In FIG. 6, this voltage is filtered and averaged by resistor R614 and capacitor C627 and compared to 0.1 volt at pin 8 of comparator U602. The maximum average 170 volt bus current is limited to 1.0 amp, which produces 0.1 volts at pin 8 causing pin 14 of comparator U602 to pull down and prevent more current. This limits the maximum power to about 160 watts with 120 VAC input.

Potentiometer R651 with resistor R652 provides a manual adjustment of the input current limit from zero to 1.0 amp. This is equivalent to being able to set to any constant output power from 0 to 160 watts.

The two other comparators in comparator U602 are cross-connected to form a start/stop latch. When the power converter is operating, the voltage on pin 4 is higher than pin 5, causing pin 2 to be low. Pin 2 pulls pin 6 to a lower voltage than pin 7, allowing pin 1 to open circuit, and the converter continues to operate. If pin 4 is momentarily pulled lower than 1.1 volts, pin 2 momentarily becomes an open circuit, which allows the approximately 8 volts on capacitor C422 connected to divider resistor R633 and R634 to raise pin 6 above 0.1 volts. This pulls down pin 1 and stops the power converter. Since pin 4 is now held below 1.1 volts, the start/stop latch will remain in the "off" state for 3 seconds, until capacitor C422 has discharged to below 0.6 volts. The power converter can not re-start during the 3 second delay, even though modulator I.C. 406 receives 15 volts from the startup capacitor C405. However, If the power converter has been off for longer than 3 seconds, it will start quickly when the off/on switch 432 is closed. This feature avoids the potential safety problems of the output power appearing unexpectedly, 3 seconds after the switch is closed.

When the power converter is operating, 15 volt supply winding supplies operating power to the modulator I.C. 406. The 15 volt winding 420 shown in FIG. 6 is in proximity to the primary on output transformer 406. The windings are phased connected so that the winding end that connects to diode 431 (in FIG. 6), has the same polarity as the winding end of the primary that connects to FET 410 (in FIG. 5). The result of this winding phase is to produce a more constant voltage on capacitor C422, which makes the 3 second re-start delay more independent of pulse-width. Diode 431 is in the charging path for capacitor C405, and diode 421 is in the charging path for capacitor C422.

The output voltage sense winding 423 shown in FIG. 6 is in proximity to the output winding on transformer 413 shown in FIG. 5. The proximity to the output winding is necessary to most accurately measure the output voltage due to the voltage error causing leakage inductance L between the primary and secondary windings on transformer 413. A noise filter comprised of resistor R636 and capacitor C632 removes switching noise spikes picked up by the output voltage sense winding. Resistor R635 in combination with R636 creates a voltage divider allowing only over-voltage levels detected by the winding 423 that are 50% above normal levels to conduct through diode D632 and pull pin 4 of comparator U602 below 1.1 volts. This causes the power converter to shut down for 3 seconds.

The ground fault current detector circuit is connected to the center-tap of the secondary winding of output transformer 413 shown in FIG. 5. Short circuits from output line 435 or output line 436 to Earth ground causes current to flow to Earth ground through the detector current sense resistor R640 shown in FIG. 6. When enough current flows through resistor R640 to develop about 6 volts across resistor R640, current also flows through opto-isolator U603, diode D641 and diode D640. The output current of opto-isolator U603 flows through resistor R626 connected to pin 4 of comparator U602. When the current reaches about 200 microamps, pin 4 is pulled below 1.1 volts, and the power converter turns off for 3 seconds. The opto-isolator 603 is used to electrically isolate Earth ground from the input AC connections to the power supply. It is industry standard part number 4N35. Other components used in the preferred embodiment of the ground fault detector of this invention include diode D642 which reduces power dissipation in resistor R640, light emitting diode (LED) D643 whose function is to visually indicate Earth ground current, diode D644 to protect LED D643, resistor R641 to set the threshold of diode D643, capacitor C640 to increase immunity to high frequency noise, and resistor R642 to discharge capacitor C640.

Resistor voltage divider 433, R656 and R653 is connected to the 170 volt bus to detect voltages above 190 volts by raising pin 2 of the modulator I.C. 406 above 2.5 volts. When pin 2 is above 2.5 volts, pin 1 is internally pulled low, stopping the power converter for at least 3 seconds. The power converter will not restart until pin 2 is below 2.5 volts. When off/on switch 432 is open, current flows from 5 volts through the base-emitter of transistor Q622 through resistors R656 and R653 and into return. This current turns on transistor Q622 and pulls up pin 2 on comparator U601 to about 4 volts. Therefore, whenever off/on switch 432 is open and the modulator I.C. 406 turns on, the power converter will not turn on.

In the foregoing specification, the invention has been described with reference to specific exemplary embodiment thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A power converter for transferring power from an input bus having a first lead and a second lead to an output bus having a first lead and a second lead, said power converter comprising:

a first transistor having a first lead coupled to said first lead of said input bus;

a first capacitor having a first lead coupled to said first lead of said input bus;

a second transistor having a first lead coupled to said second lead of said input bus;

a second capacitor having a first lead coupled to said second lead of said input bus;

said first lead of said output bus coupled to a second lead of said first transistor and to a second lead of said second transistor;

said second lead of said output bus coupled to a second lead of said first capacitor and to a second lead of said second capacitor;

a first fixed-frequency pulsing means for controlling a first on duty percentage of said first transistor;

second pulsing means for controlling a second on duty percentage of said second transistor, wherein first and second on duty percentage total approximately 100 percent;

control means to decrease said on duty percentage of said first transistor while increasing said on duty percentage of said second transistor.

2. The power converter of claim 1 further comprising a transistor gate driving means for driving said second transistor, said transistor gate driving means comprising:

a first diode having a first diode lead and a second diode lead, said first diode lead coupled to said second lead of said first transistor, and said second diode lead coupled to said second lead of said second transistor and said first lead of said output;

a third capacitor having a first capacitor lead and a second capacitor lead, said first capacitor lead coupled to said second lead of said second transistor;

a third transistor having an emitter coupled to said second capacitor lead of said third capacitor, a collector coupled to a gate of said second transistor and also coupled to said second lead of said first transistor;

a second diode coupled to base of said third transistor and said first pulsing means;

a third diode coupled to said base and said emitter of said third transistor;

a first resistor coupled to said base of said third transistor and to said second lead of said second transistor;

a fourth diode coupled to said second lead of said second transistor and said first input lead, wherein said transistor gate driving means receives a signal from said first transistor and provides a turn on signal to said second transistor only when said first transistor is off.

3. The power converter of claim 1 further comprising an output capacitor for providing zero average current flow in said output bus.

4. The power converter of claim 1 further comprising a regulating means for creating a power limit and to provide a manual adjustment of output power.

5. The power converter of claim 1 further comprising a means for improving stability when inductive and capacitive elements are coupled across said output bus.

6. The power converter of claim 1 further comprising a delaying means for providing a delay for a repeating startup.

7. The power converter of claim 1 further comprising a peak to peak voltage responding circuit, wherein an internal power supply voltage variation is controlled.

8. The power converter of claim 1 further comprising a means for providing a mechanical switch circuit with a high voltage and a low current.

9. The power converter of claim 1 further comprising an output voltage limiter means.

10. The power converter of claim 1 further comprising a protecting means for increasing a tolerance to an excessive input voltage.

11. The power converter of claim I further comprising a surge limiting means for reducing a current surge when turning on.

12. The power converter of claim 1 further comprising a fault detecting means for detecting and reducing an Earth ground current.

13. The power converter of claim 1 further comprising a temperature limiting means for regulating a maximum temperature to a predetermined valued.

14. A power converter for transferring power from an input bus to an output bus, said power converter comprising:

a four transistor, full bridge switching structure consisting of an upper left transistor, an upper right transistor, a lower left transistor, and a lower right transistor;

a symmetrical, alternating pulse width modulator coupled to said lower left transistor and coupled to said lower right transistor, wherein both said lower transistors are turned on alternately with variable and equal on times;

a controller coupled to said switching structure and also coupled to said pulse width modulator, for turning on and off each said upper transistor inversely to the on or off state of each said lower transistor that is directly below.

15. A power converter for transferring power from an input bus having a first lead and a second lead to an output bus having a first lead and a second lead, said power converter comprising:

a first transistor having a first lead coupled to said first lead of said input bus;

a second transistor having a first lead coupled to said second lead of said input bus;

a first diode having a first diode lead and a second diode lead, said first diode lead coupled to said second lead of said first transistor, and said second diode lead coupled to said second lead of said second transistor and to said first lead of said output bus;

a first capacitor having a first capacitor lead and a second capacitor lead, said first capacitor lead coupled to said second lead of said second transistor;

a third transistor having a first lead coupled to said second capacitor lead of said first capacitor, a second lead coupled to a third control lead of said second transistor and also coupled to said second lead of said first transistor, wherein said third transistor turns on said second transistor and said first transistor turns off said second transistor;

a first pulsing means coupled to a third control lead of said first transistor, wherein said first pulsing means turns on and off said first transistor;

a second diode coupled between a third control lead of said third transistor and said first pulsing means, wherein said third transistor is turned off and first capacitor is charged by current flow through said second diode when said first transistor is turned on;

a third diode coupled between said second lead of said second transistor and said first input lead of said input bus, wherein said third diode limits the voltage excursions of said first lead of said output bus to approximately the voltage at said first lead of said input bus.

16. The power converter of claim 15 further comprising a regulating means for creating a power limit and to provide a manual adjustment of output power.

17. The power converter of claim 15 further comprising a delaying means for providing a delay for a repeating startup.

18. The power converter of claim 15 further comprising a protecting means for increasing a tolerance to an excessive input voltage.

19. The power converter of claim 15 further comprising a surge limiting means for reducing a current surge when turning on.

20. The power converter of claim 15 further comprising a temperature limiting means for regulating a maximum temperature to a predetermined value.

* * * * *